US 8,849,871 B2

(12) United States Patent
Idicula et al.

(10) Patent No.: US 8,849,871 B2
(45) Date of Patent: Sep. 30, 2014

(54) EFFICIENT PUSHDOWN OF JOINS IN A HETEROGENEOUS DATABASE SYSTEM INVOLVING A LARGE-SCALE LOW-POWER CLUSTER

(71) Applicant: Oracle International Corporation, Redwood Shores, CA (US)

(72) Inventors: Sam Idicula, Santa Clara, CA (US); Sabina Petride, Hayward, CA (US); Nipun Agarwal, Saratoga, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/645,030

(22) Filed: Oct. 4, 2012

(65) Prior Publication Data
US 2014/0101205 A1 Apr. 10, 2014

(51) Int. Cl.
*G06F 7/00* (2006.01)
*G06F 17/30* (2006.01)

(52) U.S. Cl.
CPC .................. *G06F 17/30598* (2013.01)
USPC ......................................................... 707/803

(58) Field of Classification Search
None
See application file for complete search history.

(56) References Cited

U.S. PATENT DOCUMENTS

| | | | | |
|---|---|---|---|---|
| 5,943,666 | A * | 8/1999 | Kleewein et al. ..................... | 1/1 |
| 5,978,789 | A * | 11/1999 | Griffin et al. ......................... | 1/1 |
| 6,112,198 | A * | 8/2000 | Lohman et al. ....................... | 1/1 |
| 6,954,776 | B1 * | 10/2005 | Cruanes et al. ............... | 709/201 |
| 7,233,939 | B1 * | 6/2007 | Ziauddin ....................... | 707/718 |
| 2006/0294162 | A1 * | 12/2006 | Makansi et al. .............. | 707/204 |
| 2010/0205170 | A1 * | 8/2010 | Barsness et al. .............. | 707/714 |
| 2011/0302151 | A1 * | 12/2011 | Abadi et al. .................. | 707/714 |
| 2011/0302583 | A1 * | 12/2011 | Abadi et al. .................. | 718/102 |
| 2012/0036167 | A1 * | 2/2012 | Herrnstadt .................... | 707/803 |
| 2012/0310916 | A1 * | 12/2012 | Abadi et al. .................. | 707/713 |
| 2013/0151889 | A1 * | 6/2013 | Markus ....................... | 714/6.11 |

OTHER PUBLICATIONS

Oveview of the Oracle Exadata Database Machine and Exadata Storage Server: http://www.oracle.com/technetwork/database/exadata/exadata-technical-whitepaper-134575.pdf, dated Jun. 2012, 36 pages.
DeWitt, D., and R. Gerber, "Multiprocessor Hash-Based Join Algorithms," Proceedings of the 1985 VLDB Conference, Stockholm, Sweden, dated Aug. 1985, 14 pages.
Schneider, D. and D. DeWitt, "A Performance Evaluation of Four Parallel Join Algotithms in a Shared-Nothing Multiprocessor Environment", Proceedings of the 1989 SIGMOD Conference, Portland, OR, dated Jun. 1989, 12 pages.
Kossmann D., "The State of the Art in Distributed Query Processing" ACM Computing Surveys, ACM, New York, NY, dated Dec. 2000, 48 pages.
Bajda-pawlikowski et al., "Efficient Processing of Data warehousing queries in a split execution environment", Procceeding Sigmod, dated 2011, dated Jun. 12, 2011, 6 pages.

* cited by examiner

*Primary Examiner* — Jay Morrison
(74) *Attorney, Agent, or Firm* — Hickman Palermo Truong Becker Bingham Wong LLP

(57) ABSTRACT

A system and method for allocating join processing between and RDBMS and an assisting cluster. In one embodiment, the method estimates a cost of performing the join completely in the RDBMS and the cost of performing the join with the assistance of a cluster coupled to the RDBMS. The cost of performing the join with the assistance of the cluster includes estimating a cost of a broadcast join or a partition join depending on the sizes of the tables. Additional costs are incurred when there is a blocking operation, which prevents the cluster from being able to process portions of the join. The RDBMS also maintains transactional consistency when the cluster performs some or all of the join processing.

20 Claims, 7 Drawing Sheets

EFFICIENT PUSHDOWN OF JOINS IN A HETEROGENEOUS DATABASE SYSTEM INVOLVING A LARGE-SCALE LOW-POWER CLUSTER

FIELD OF THE INVENTION

The present invention relates generally to database management systems and more particularly to optimizing join processing in a cluster assisted RDBMS.

BACKGROUND

Query processing has been optimized for disk-based systems, because these systems can hold very large tables on which the processing operates. A common operation in query processing includes generating joins of these large tables, but the joins may incur many trips to the disk system, reducing performance. Locating the tables in memory, with multiple servers providing the large amounts of memory needed, improves performance. However, the higher performance comes at the price of high power consumption of the servers.

An alternative to multiple servers is a cluster of low power nodes, each of which has a low power processor, a modest amount of memory, and no persistent storage that would virtualize the memory. The cluster, however, can have a very large number, in fact, thousands of nodes. The aggregate memory and processing power of the large number of nodes provides the benefits of multiple servers but at low power.

Given the cluster's high processing power and low power consumption, it is desirable to optimize query processing for a cluster so that it can handle even larger tables with high performance. Because a cluster lacks persistent storage and access to transaction logs, the cluster cannot take on all of the database management tasks demanded by query processing. The cluster has to interface with a traditional relational database management server (RDBMS) to obtain tables or portions of tables on which the cluster operates and it has to rely on the RDBMS to maintain transactional consistency. The heterogeneous system, the traditional RDBMS server and the cluster, provides the possibility of higher performance and low power for query processing. To obtain the most performance from such as system, a mechanism is needed to optimally allocate the query processing, such as join operations, between the cluster and the RDBMS.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1:
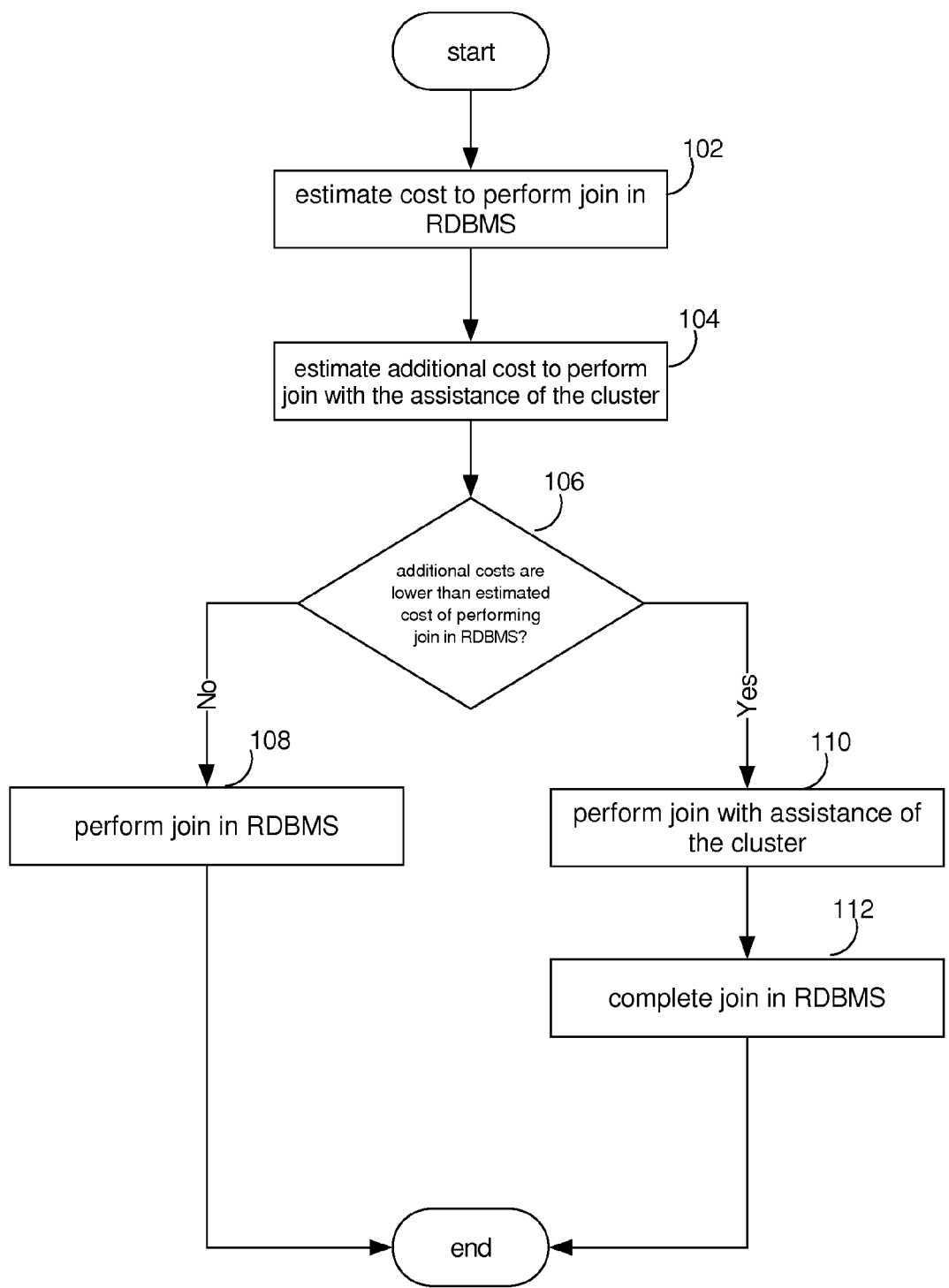
FIG. 1 depicts a flow chart of the overall operation of an embodiment.

An embodiment, depicted in FIG. 1, determines the most efficient allocation of work between the RDBMS and the cluster. In step 102, the embodiment estimates the cost to perform an operation, such as a join, in the RDBMS and, in step 104, the cost of performing the operation with the assistance of the cluster. The embodiment compares, in step 106, the two estimated costs and performs the operation in the place with the lowest cost. If a join is performed in the RDBMS as in step 108, the cost is simply the cost of sending the relations to the RDBMS and performing the join in the RDBMS. If the join is performed with the assistance of the cluster, as in step 110, then additional costs are incurred to obtain the performance benefit of the cluster. These additional costs do not include the completion of the join 112 in the RDBMS, in FIG. 1, because the completion of the join occurs in either case.

The additional costs of using the cluster depend on the type of join and whether any blocking operations are present. Types of joins include broadcast joins and partitioned joins, as depicted in FIG. 2.

Figure 2:
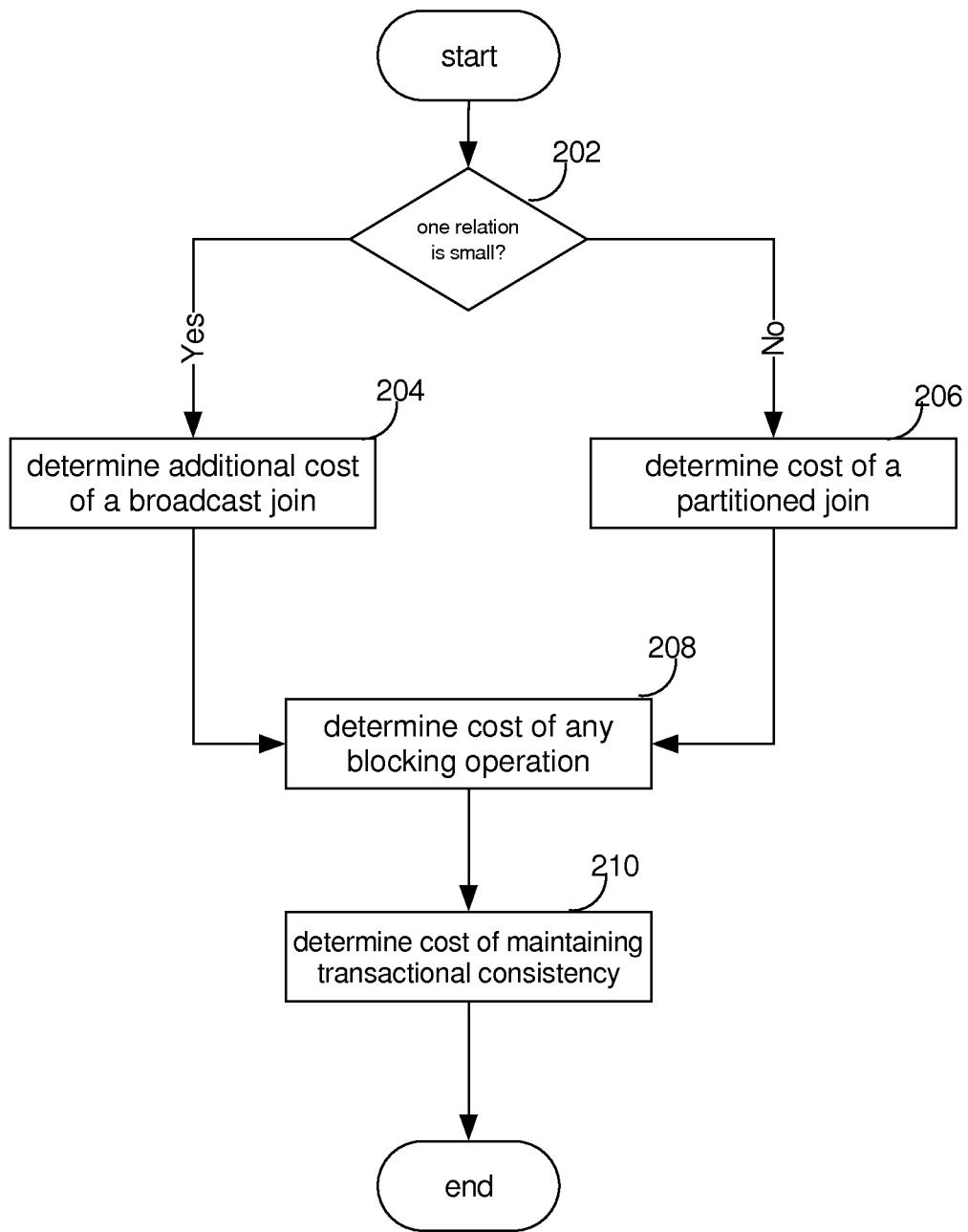
FIG. 2 depicts a flow chart of estimating the cost of performing a join operation in the cluster.

In a broadcast join, if one of the relations is small enough, as determined in step 202 of FIG. 2, to fit in each unit of the cluster, then it is broadcast to all of the processing units in the cluster. As determined in step 204, the additional costs of this join include the broadcast and the cost of joining the small relation with part of the large relation in each processing unit.

In a partitioned join as depicted in FIG. 2, each relation to be joined is partitioned based on a join column and the separate partitions are processed by the individual processing units in the cluster. As determined in step 206, the additional costs of this join include the partitioning and the cost of joining a partition of each relation.

As depicted in step 208 of FIG. 2, blocking operations incur additional costs. These operations, such as sorting and grouping, read all input rows before any output row can be produced, thus preventing other dependent operations from being performed completely in the cluster. Instead, part of the operation must be performed in the RDBMS. Specifically, the RDBMS must integrate/merge the results of the blocking operation, partition the results among the processing unit in the cluster, and merge the results from the processing units. A blocking operation thus incurs the additional costs of sending the results of the blocking operation to the RDBMS, the cost of partitioning in the RDBMS, and the cost of sending the partitions back to the processing units in the cluster.

Not only are additional costs to use the cluster incurred, but other aspects of transaction processing are affected, as indicated in step 210 of FIG. 2. Specifically, performing operations in the cluster affects the degree of parallelism in the RDBMS and requires that the RDBMS ensure transaction consistency.

Detailed Discussion

Prior to performing a join, the RDBMS first estimates the sizes of the two relations to be joined after apply any filters, including any applicable Bloom filters and projections. The size estimates of the resulting relations include the total number of rows and the total number of bytes. These estimates help determine the costs described below.

Next, the RDBMS determines whether there are any blocking query operations, such as sorting and grouping, under the join in the query plan. If any blocking operations are required, then the RDBMS must take this into account in the cost of the join operation.

If the join and the query sub-tree under it can be performed fully in the cluster, the RDBMS decides what distributed join algorithm would be best.

Additionally, the RDBMS tracks the available memory on each processing unit via periodic status messages sent by each of the processing units.

General Cost Of Join

To assess the cost of a join, the system assesses costs under three categories, the cost of partitioning a relation C1, the cost of sending relations or partitions of relations C2, and the cost of performing the actual join C3.

The cost of partitioning a relation C1 depends on the number of rows, the average size of the join key, and the compute and memory bandwidth of a processing unit. The cost of sending relations or partitions C2 depends on the interconnect bandwidth and size of the relation in bytes, which was determined in a preliminary step. The cost of sending any Bloom filters is negligible and is not considered as a cost item. Additionally, the evaluation of Bloom filters can be done during a table scan in the cluster, so the evaluation cost is excluded. The cost of a join C3 depends on the number of rows in the two relations (or sub-relations) being joined, the size of the join result in bytes, and the compute and memory bandwidth of the processing unit. Joins performed completely in the RDBMS operate on the entire relations to be joined. Joins performed in the cluster operate on partitions of both relations.

Join In The RDBMS

The cost of performing a join entirely in the RDBMS includes only the cost of sending both relations (C2) to the RDBMS and performing the actual join (C3). There is no cost of partitioning (C1) a relation because the RDBMS performs the join on the entire relations.

Join In Cluster

Broadcast Join

Figure 3:
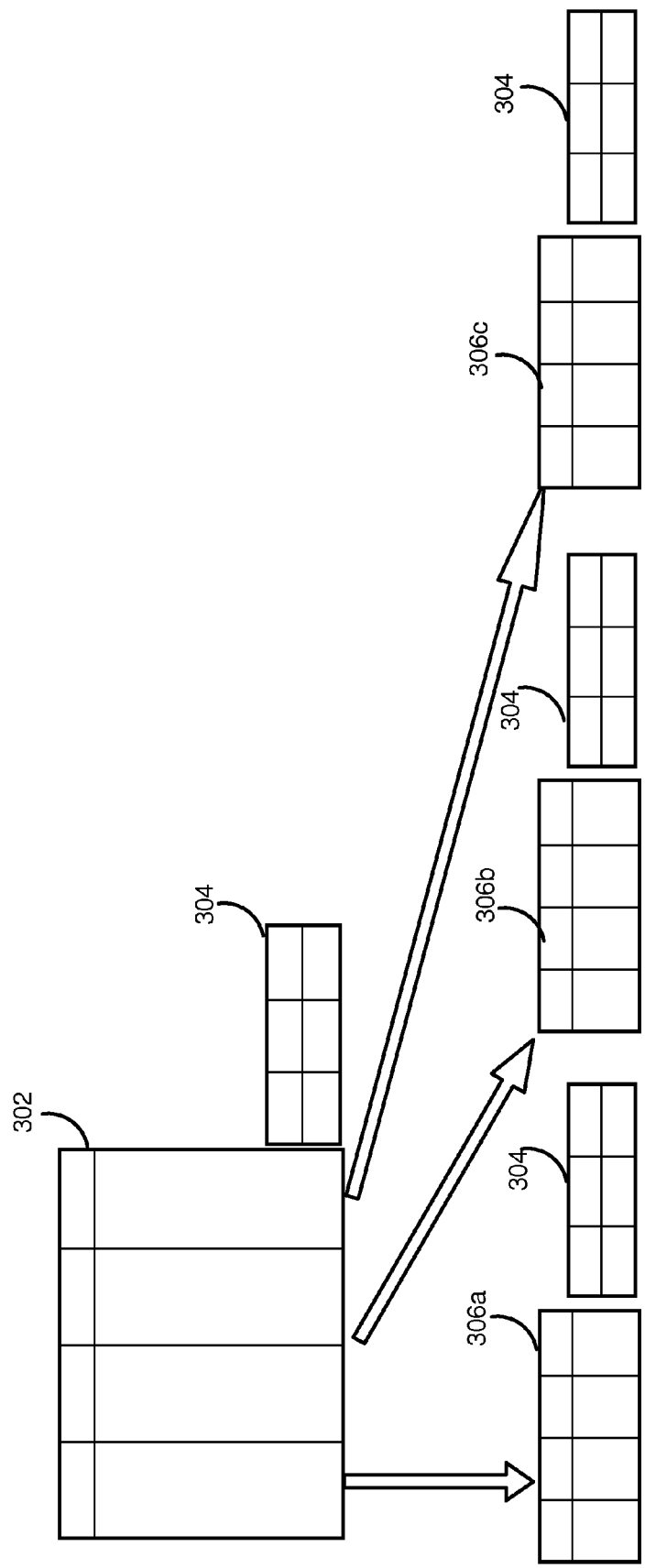
FIG. 3 depicts a broadcast join operation.

As mentioned above, a broadcast join, depicted in FIG. 3, is possible when one relation 304 of the two, 302, 304 to be joined is small, meaning that the smaller relation 304 can fit in the memories of the processing units. In FIG. 3, the larger relation 302 is partitioned among three nodes, as 306a,b,c while the smaller relation 304 is broadcast to those nodes. The smaller relation 304 can be either naturally smaller or made smaller by filtering a larger relation.

Thus, for a broadcast join, the additional cost (to the RDBMS cost) includes the cost of partitioning the larger relation (C1), the cost (C2) of sending the smaller relation to all of the processing units, the cost (C2) of sending the partition of the larger relation to all of the processing units, and the cost (C3) of the join in each of the processing units. The cost of sending the partial joins back to the RDBMS is not included, because this is already accounted for in the cost for performing the join entirely in the RDBMS.

Partitioned Join

Figure 4:
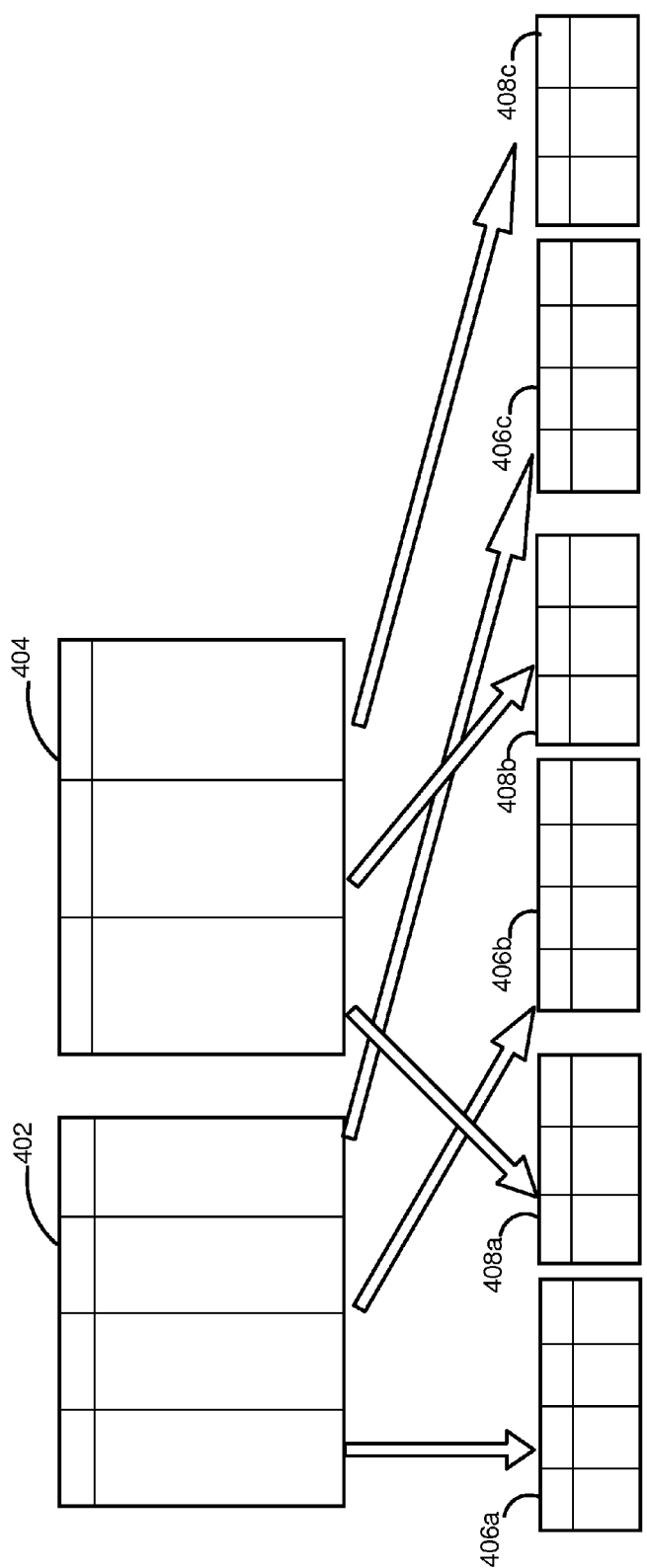
FIG. 4 depicts a partition join operation.

If a broadcast join is not feasible, the RDBMS considers the cost of a partitioned join. As shown in FIG. 4, each of the relations to be joined 402, 404 is partitioned, according to partitioning parameters set by the RDBMS, based on global statistics about the entire data set. The partition pairs 406a 408a, 406b 408b, 406c 408c are then sent to each of the processing units. Thus, there is an additional C1 cost of partitioning the relations, and an additional C3 cost for performing the partial joins in each of the units. A C2 cost is not included because it is already accounted for in the RDBMS join. The C1 cost of partitioning the relations can be avoided if the relations are partitioned at load time.

Blocking Operations

If a blocking operation is involved in performing either a broadcast join or a partitioned join, then additional costs are incurred. A C2 cost is incurred in sending the relation to the RDBMS after the blocking operation is performed. A C1 cost is incurred in partitioning the sent relation. Finally, a C2 cost is incurred in sending the partitioned relation back to the cluster.

Avoiding Partition Costs

In certain cases, the system can avoid some of the costs associated with processing joins in the cluster by pre-distributing portions of relations into the processing units of the cluster in a favorable manner. One way the data can be pre-distributed into the cluster depends on an application's access patterns. Another way depends on how the processing units are connected to switches in the cluster.

In the case of distributing data according to an application's access patterns, the data is distributed in a way that co-locates corresponding partitions of different tables. The tables to group together can be found by using referential constraints between tables or by grouping all tables whose partition keys are of the same type. For example, if a storage partition is split across two processing units, the same split value is used for all tables whose partition keys are of the same type. This technique ensures that for joins in which the join columns are the same as the partition keys, the tables are already partitioned and conveniently reside in the proper processing units.

In the case of distributing data based on the arrangement of switches in the cluster, tables that cannot be replicated on every node can still be replicated among sets of nodes that are connected to a common switch in the cluster. Processing units connected to a common switch have greater bandwidth for communicating among each other. When a join needs to be performed, the partitioning and redistribution of data needs to be done only within the set of units connected to the common switch. In the case of a cluster having a large number of processing units, distributing data based on the switch arrangement is particularly advantageous.

As mentioned above, when the cluster participates in database operations, parallelism in the RDBMS and transaction consistency are affected.

Parallelism In RDBMS

Because a cluster may be performing significant query processing for the RDBMS, in one embodiment, the RDBMS adjusts the number of parallel query processes or threads in accordance with the amount of work the cluster is performing. If a join is processed completely in a cluster, then each parallel query process or thread handles only the communication with the units in the cluster. Specifically, the RDBMS obtains results from the processing units and streams them to other parallel query processes that perform further operations on the query. In this case, the number of processing units assigned to each process (and hence the degree of parallelism) depends on the estimated size of the join result and rate at which the processing units are expected to process the join. The processes or threads in the RDBMS are arranged to process the results from the processing units at the rate at which the results are produced.

In the case where a blocking operation is involved with the join, the degree of parallelism is set to efficiently merge the results of the blocking operation and then partition it among the units in the cluster. The degree of parallelism in this case is set in a way that is similar to the merge phase of a sort operation. Each process in the RDBMS needs to be able to merge the results sent to it without becoming a bottleneck, as well as participate in a final merge among all of the processes. At runtime, each processing unit first sends its result size and based on the distribution of sizes, the units are divided among the RDBMS processes to equalize the load.

Transaction Consistency

Figure 5:
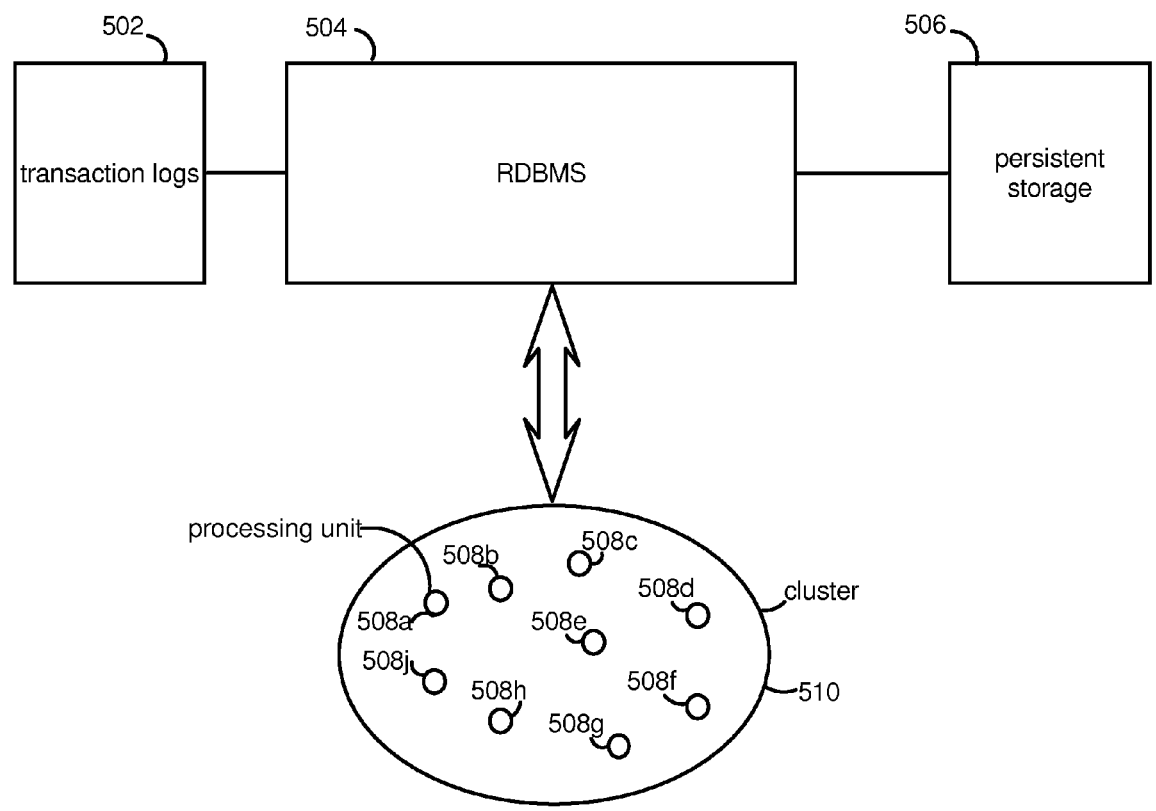
FIG. 5 depicts an RDBMS coupled to a cluster.

In the heterogeneous system depicted in FIG. 5, the RDBMS preserves transactional consistency. Using its access to the transaction logs 502 in FIG. 5, the RDBMS 504 takes several steps to assure transaction consistency when a cluster 510 with processing units 508a-j is involved in a transaction.

First, before the cluster performs a query, the RDBMS 504 makes sure that the items affected by the query are updated from any write buffers holding data for those items.

Figure 6:
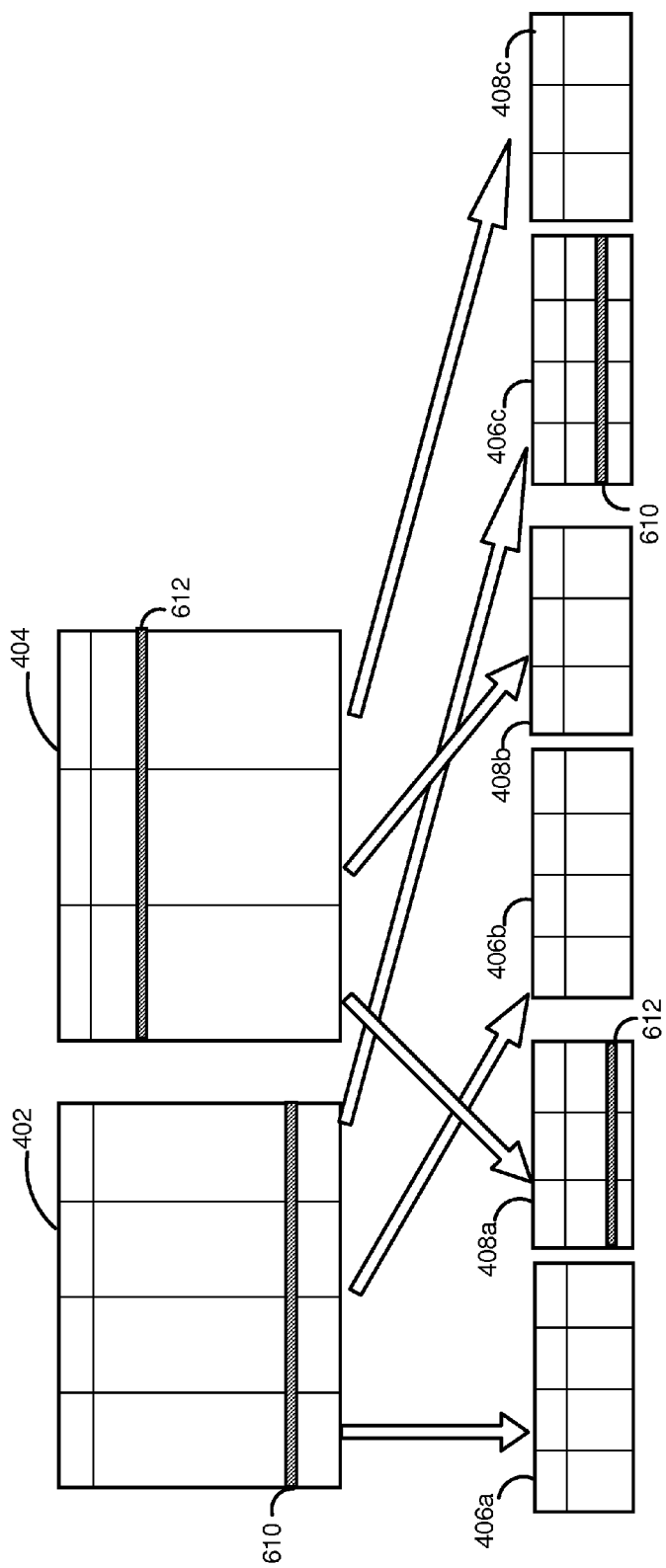
FIG. 6 depicts a join in which the relations include unprocessed blocks.

Second, the RDBMS 504 makes sure that the cluster only processes rows in blocks having snapshot identifiers that are no later than the snapshot identifiers of the query itself. Any blocks that have identifiers later than the query's snapshot identifier are sent to the RDBMS as unprocessed blocks, as depicted in FIG. 6, where the unprocessed blocks include row 610 in relation 402 and row 612 in relation 404.

Third, a mechanism in the RDBMS 504 is provided to handle any unprocessed blocks such as those including 610, 612. The mechanism includes enhancements that permit the RDBMS 504 to perform a partial evaluation for a given set of blocks. In the case of a query plan whose tree includes a table scan row source, the enhancement is to scan only the given blocks. Grouping and sorting row sources build on this enhancement, merging the partial evaluations with those from the cluster.

In the case of a query plan that includes a join row source, both of its child row sources are first initialized with the set of unprocessed blocks such as those including rows 610, 612 for each underlying table 402, 404 as well as the results from the operations of the cluster, if necessary. The RDBMS 504 tracks partial results (called "deltas") of both child row sources by computing Bloom filters for the partial results, which it then sends to the processing units in the cluster. The processing units use the Bloom filters to determine the number of join matches in the cluster. If there are a small number of matching rows (corresponding to rows from one of the child row sources) in the cluster, then the matching rows are sent to the RDBMS 504 along with the join results. The RDBMS 504 then calculates the join results corresponding to the deltas and their matching rows. If there are a large number of matching rows across all of the units in the cluster and the size of the matching rows is greater than the size of the corresponding delta, then the RDBMS 504 broadcasts the delta to all of the processing units in the cluster. The join results corresponding to the deltas are then computed by the processing units in the cluster and sent back to the RDBMS 504.

To decide whether or not the RDBMS 504 should process the deltas, the system makes an estimate of the efficiency of the Bloom filter on the join key column. Based on the join filter estimate, the cost of sending deltas (from the RDBMS 504) or sending matching rows (from the processing units) and the incremental cost of processing the join for the deltas are estimated. The main impact of this is that if the delta is large, it is usually better to process the join entirely in the RDBMS 504. In most data warehouse scenarios the delta is expected to be small (if not null) since updates are infrequent, and done in a batch-oriented fashion.

Note that this process increases the overall cost of join processing. In the cost model described above, this mainly affects the cost of processing the join in the cluster. The cost model should include the extra cost of consistency processing for the join row source but excludes the cost of consistency processing for the child row sources, because the RDBMS 504 performs this processing in all cases.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
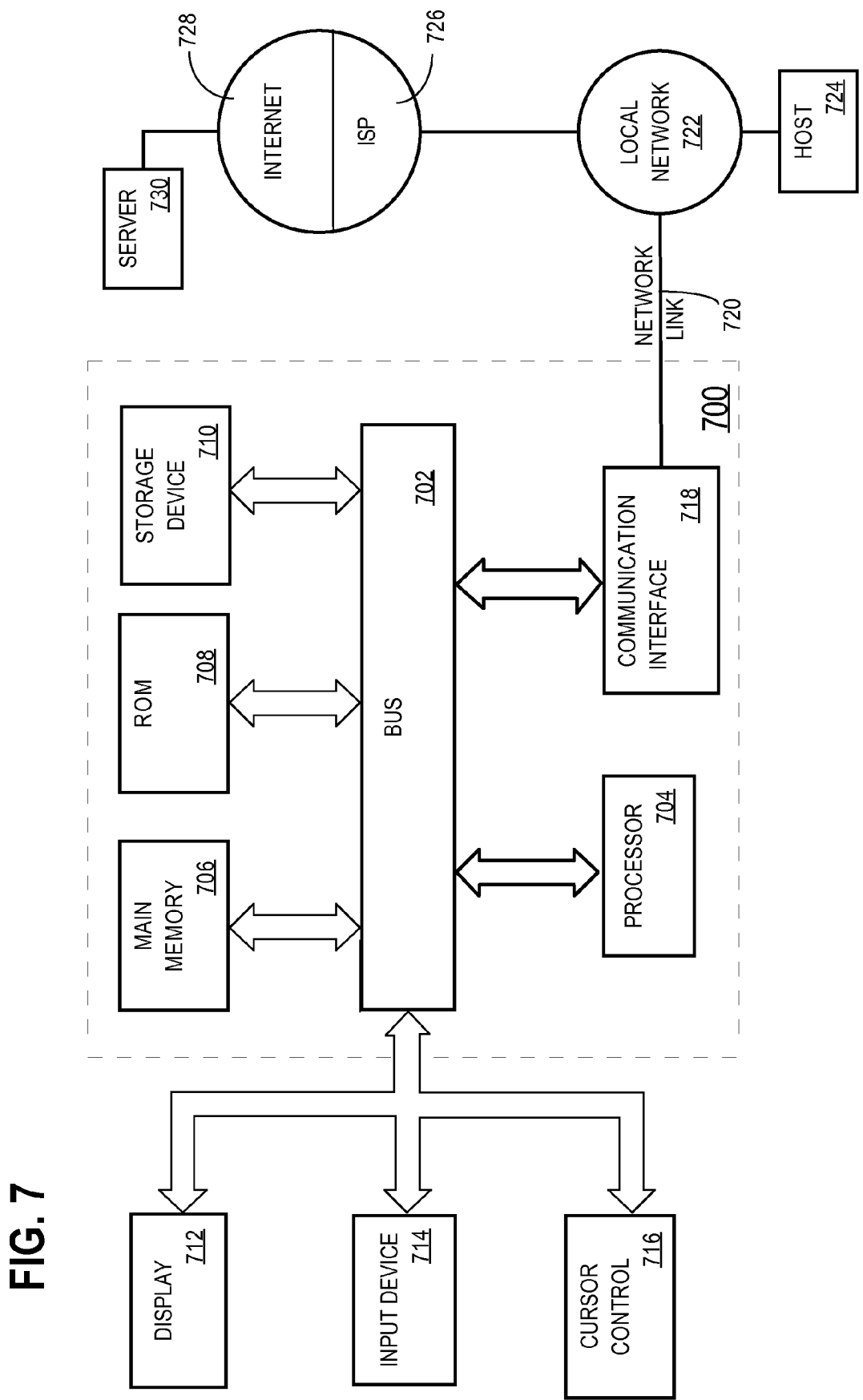
FIG. 7 depicts an example system in which an embodiment operates.

For example, FIG. 7 is a block diagram that depicts a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, convert computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 620 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the embodiments, and what is intended by the applicants to be the scope of embodiments, is the literal and equivalent scope of the set of claims that issue from this application, in the specific form in which such claims issue, including any subsequent correction.

What is claimed is:

1. A method for performing a join in a data set managed by a relational database management system (RDBMS) coupled to a cluster of nodes, each node configured to store a portion of the data set in non-persistent memory, the method comprising:
    storing, by the RDBMS, transactional data corresponding to one or more database transactions performed on the data set;
    determining a snapshot identifier of a query containing the join;
    estimating a cost of performing the join fully in the RDBMS without performing distributed join operation in the cluster of nodes;
    estimating a cost of performing the join with the assistance of the cluster by performing at least one distributed join operation in at least one node of the cluster of nodes; and
    performing the join with the assistance of the cluster when the estimated cost of performing the join with the assistance of the cluster is lower than the estimated cost of performing the join fully in the RDBMS;
    wherein the RDBMS ensures transactional consistency based on the transactional data when the join is performed with the assistance of the cluster by preventing the cluster from performing distributed join operations on data having a snapshot identifier later than the snapshot identifier of the query.

2. The method of performing recited in claim 1, wherein the step of estimating a cost of performing the join with the assistance of the cluster includes determining an additional cost of a broadcast join.

3. The method of performing recited in claim 2,
    wherein the broadcast join unites a larger relation and a smaller relation; and
    wherein the additional cost includes a cost of partitioning the larger relation among the nodes of the cluster, a cost of sending the smaller relation to the nodes of the cluster, and a cost of performing the join in each of the processing units.

4. The method of performing recited in claim 1, wherein the step of estimating a cost of performing the join with the assistance of the cluster includes determining an additional cost of a partitioned join.

5. The method of performing recited in claim 4,
wherein the partitioned join unites a first and a second relation; and
wherein the additional cost includes a cost of partitioning the first and second relations among the nodes of the cluster, and a cost of performing a join of each partitioned first relations and second relation in the nodes of the cluster.

6. The method of performing recited in claim 1, wherein the step of estimating a cost of performing the join with the assistance of the cluster includes determining an additional cost of a blocking operation.

7. The method of performing recited in claim 6, wherein the additional cost includes a cost of sending the relation to the RDBMS after the blocking operation is performed, the cost of partitioning the sent relation, and the cost of sending the partitioned relation back to the nodes of the cluster.

8. The method of performing recited in claim 1, wherein the step of estimating a cost of performing the join with the assistance of the cluster includes determining an additional cost of maintaining transactional consistency.

9. The method of performing recited in claim 8, wherein the additional cost includes a cost of processing deltas.

10. The method of performing recited in claim 1, wherein the RDBMS is capable of redistributing the data set among the cluster of nodes before or after receiving a query, and wherein a particular portion of the data set may be stored on more than one node of the cluster of nodes.

11. A non-transitory computer readable medium storing instructions for performing a join in a data set managed by a relational database management system (RDBMS) coupled to a cluster of nodes, each node configured to store a portion of the data set in non-persistent memory, wherein processing the instructions by one or more processors causes:
storing, by the RDBMS, transactional data corresponding to one or more database transactions performed on the data set;
determining a snapshot identifier of a query containing the join;
estimating a cost of performing the join fully in the RDBMS without performing any distributed join operation in the cluster of nodes;
estimating a cost of performing the join with the assistance of the cluster by performing at least one distributed join operation in at least one node of the cluster of nodes; and
performing the join with the assistance of the cluster when the estimated cost of performing the join with the assistance of the cluster is lower than the estimated cost of performing the join fully in the RDBMS;
wherein the RDBMS ensures transactional consistency based on the transactional data when the join is performed with the assistance of the cluster by preventing the cluster from performing distributed join operations on data having a snapshot identifier later than the snapshot identifier of the query.

12. The non-transitory computer readable medium of claim 11, wherein the step of estimating a cost of performing the join with the assistance of the cluster includes determining an additional cost of a broadcast join.

13. The non-transitory computer readable medium of claim 12,
wherein the broadcast join unites a larger relation and a smaller relation; and
wherein the additional cost includes a cost of partitioning the larger relation among the nodes of the cluster, a cost of sending the smaller relation to the nodes of the cluster, and a cost of performing the join in each of the processing units.

14. The non-transitory computer readable medium of claim 11, wherein the step of estimating a cost of performing the join with the assistance of the cluster includes determining an additional cost of a partitioned join.

15. The non-transitory computer readable medium of claim 14,
wherein the partitioned join unites a first and a second relation; and
wherein the additional cost includes a cost of partitioning the first and second relations among the nodes of the cluster, and a cost of performing a join of each partitioned first relations and second relation in the nodes of the cluster.

16. The non-transitory computer readable medium of claim 11, wherein the step of estimating a cost of performing the join with the assistance of the cluster includes determining an additional cost of a blocking operation.

17. The non-transitory computer readable medium of claim 16, wherein the additional cost includes a cost of sending the relation to the RDBMS after the blocking operation is performed, the cost of partitioning the sent relation, and the cost of sending the partitioned relation back to the nodes of the cluster.

18. The non-transitory computer readable medium of claim 11, wherein the step of estimating a cost of performing the join with the assistance of the cluster includes determining an additional cost of maintaining transactional consistency.

19. The non-transitory computer readable medium of claim 18, wherein the additional cost includes a cost of processing deltas.

20. The non-transitory computer readable medium of claim 11, wherein the RDBMS is capable of redistributing the data set among the cluster of nodes before or after receiving a query, and wherein a particular portion of the data set may be stored on more than one node of the cluster of nodes.

* * * * *

UNITED STATES PATENT AND TRADEMARK OFFICE
CERTIFICATE OF CORRECTION

PATENT NO.         : 8,849,871 B2                                                Page 1 of 1
APPLICATION NO.    : 13/645030
DATED              : September 30, 2014
INVENTOR(S)        : Idicula et al.

It is certified that error appears in the above-identified patent and that said Letters Patent is hereby corrected as shown below:

On the Title page:

Column 2, under Other Publications, line 1, delete "Oveview" and insert -- Overview --, therefor.

Column 2, under Other Publications, line 9, delete "Algotithms" and insert -- Algorithms --, therefor.

Column 2, under Other Publications, line 16, delete "Procceeding" and insert -- Proceeding --, therefor.

In the Claims:

In column 8, line 41, in Claim 1, delete "performing" and insert -- performing any --, therefor.

Signed and Sealed this
Fifth Day of May, 2015

Michelle K. Lee
*Director of the United States Patent and Trademark Office*